United States Patent
Amtsfeld et al.

(10) Patent No.: US 11,679,748 B2
(45) Date of Patent: Jun. 20, 2023

(54) ELECTRONICALLY CONTROLLED PNEUMATIC BRAKE SYSTEM COMPRISING AN ELECTRONICALLY CONTROLLED TRAILER CONTROL MODULE

(71) Applicant: WABCO Europe BVBA, Brussels (BE)

(72) Inventors: Joachim Amtsfeld, Hemmingen (DE); Henning Förster, Nordstemmen (DE); Thilo Klostermann, Barsinghausen (DE); Florian Schwagmeyer, Uetze-Dollbergen (DE)

(73) Assignee: ZF CV Systems Europe BV, Brussels (BE)

( * ) Notice: Subject to any disclaimer, the term of this patent is extended or adjusted under 35 U.S.C. 154(b) by 341 days.

(21) Appl. No.: 16/983,150

(22) Filed: Aug. 3, 2020

(65) Prior Publication Data

US 2022/0032891 A1 Feb. 3, 2022

(51) Int. Cl.
*B60T 13/68* (2006.01)
*B60T 7/04* (2006.01)
*B60T 15/02* (2006.01)
*B60T 13/38* (2006.01)

(52) U.S. Cl.
CPC ............ *B60T 13/683* (2013.01); *B60T 7/042* (2013.01); *B60T 13/385* (2013.01); *B60T 15/027* (2013.01); *B60T 2270/413* (2013.01)

(58) Field of Classification Search
CPC .. B60T 13/683; B60T 7/042; B60T 2270/413; B60T 15/027; B60T 13/385
See application file for complete search history.

(56) References Cited

U.S. PATENT DOCUMENTS

| | | | |
|---|---|---|---|
| 8,282,173 B2* | 10/2012 | Forster | B60T 13/263 303/7 |
| 9,676,378 B2* | 6/2017 | Kiel | B60T 17/04 |
| 11,034,341 B2* | 6/2021 | Wulf | B60T 15/043 |
| 2013/0214588 A1* | 8/2013 | Kiel | B60T 13/68 137/625.2 |
| 2013/0304343 A1* | 11/2013 | Feyerabend | B60T 17/221 701/70 |
| 2020/0207319 A1* | 7/2020 | Van Thiel | B60T 13/683 |
| 2022/0227342 A1* | 7/2022 | Klostermann | B60T 13/683 |

OTHER PUBLICATIONS

WO document No. WO 2022/122433 to Klostermann et al dated Jun. 16, 2022.*

* cited by examiner

*Primary Examiner* — Pamela Rodriguez
(74) *Attorney, Agent, or Firm* — Dickinson Wright PLLC (57) ABSTRACT

An electronically controlled pneumatic brake system (2) for a vehicle 100, with a supply coupling head (24), a control coupling head (26), and an electronically controlled trailer control module (28) includes a first supply port (28.1), a trailer supply connection (28.2) for providing a trailer supply pressure (pT) to the supply coupling head (24), a trailer control connection (28.3) for providing a trailer control pressure (pB) to the control coupling head (26), an electropneumatic trailer control valve arrangement (40) for providing the trailer control pressure (pB), and a tractor protection valve electronic control unit (42). The electropneumatic trailer control valve arrangement (40) is configured to only supply a trailer control pressure (pB) to the trailer control connection (28.3) when compressed air is supplied to the trailer supply connection (28.2).

16 Claims, 7 Drawing Sheets

ELECTRONICALLY CONTROLLED PNEUMATIC BRAKE SYSTEM COMPRISING AN ELECTRONICALLY CONTROLLED TRAILER CONTROL MODULE

TECHNICAL FIELD

The present disclosure relates to an electronically controlled pneumatic brake system for a vehicle, in particular a commercial vehicle, comprising: a first brake circuit comprising first and second brake actuators, a second brake circuit comprising third and fourth brake actuators, at least a first compressed air supply, and a trailer brake circuit comprising a supply coupling head and a control coupling head, and an electronically controlled trailer control module, the tractor protection valve comprising: a first supply port for receiving supply pressure from the first compressed air supply, a trailer supply connection for providing a trailer supply pressure at the supply coupling head, a trailer control connection for providing a trailer control pressure at the control coupling head, an electro-pneumatic trailer valve arrangement in fluid connection with the first supply port for receiving the supply pressure and adapted to provide the trailer control pressure at the trailer control connection, and an electronic trailer control unit for controlling the electro-pneumatic trailer valve arrangement such that the trailer control pressure can be modulated.

BACKGROUND

Vehicles, in particular commercial vehicles, are often equipped with pneumatic brake systems. In a vehicle combination of a tractor vehicle and a trailer pressurized air and brake signals are supplied from the tractor vehicle to the trailer. Pressurized air is supplied to the trailer via a trailer supply line and pneumatic control signals are transmitted via a control line. For connecting the supply and control lines of a trailer, the pneumatic brake systems of the tractor vehicle usually has two coupling heads. Due to legal regulations in some states or regions, for example the USA, both coupling heads have to be of an open design, i.e. without check-valves. To prevent leakage when no trailer is connected to the coupling heads further measures are required. Therefore, the coupling heads are connected to a tractor protection valve, which protects the pneumatic brake system while no trailer is connected, during a trailer breakaway or when severe air leakage develops in the trailer.

In normal use the tractor protection valve is used to shut off the trailer control line before disconnection the trailer from the pneumatic brake system of the vehicle. If the supply line to the tractor is disconnected in an emergency, the tractor protection valve closes and prevents leakage of air from a control line of the pneumatic brake system. Therefore, the pneumatic brake system of the tractor remains pressurized and retains its functionality. This function is required by law in the USA.

Pneumatic tractor protection valves are commonly used in commercial vehicles such as towing trucks and tractors. For example, the TP-3DC tractor protection valve of the manufacturer Bendix Commercial Vehicle Systems LLC from Elyria Ohio is known. This tractor protection valve is a purely pneumatic valve which does not allow to modulate the pressure supplied to the trailer. Control pressure at one of its inlets is supplied to the trailer control outlet as long as trailer supply pressure is supplied to the trailer.

SUMMARY

To achieve a higher accuracy in pressure control, for automation of the brake system or due to other reasons it is desirable to electronically control the control pressure supplied to the trailer. However, due to legal regulations the tractor protection functionality needs to be ensured. Furthermore, there is a need for an economical system that uses cost-efficient components.

To solve this object, the present disclosure proposes an electronically controlled pneumatic brake system of the aforementioned type wherein the electro-pneumatic trailer valve arrangement is configured such that the trailer control pressure is only provided at the trailer control connection when supply pressure is supplied to the trailer supply connection.

The electro-pneumatic trailer control valve arrangement thus functions as a tractor protection valve. The present disclosure utilizes the knowledge that a particularly simple and inexpensive brake system can be achieved by connecting an electro-pneumatic trailer control valve arrangement such that the trailer control pressure is only supplied to the trailer control connection when compressed air is supplied to the trailer supply connection. The electro-pneumatic trailer control valve arrangement preferably generates the trailer control pressure from the compressed air which is supplied to the electro-pneumatic trailer valve arrangement via the first supply port. Thus, no trailer control pressure needs to be supplied to the tractor protection valve which allows for a cost efficient design. Furthermore, such a brake system layout is robust against wear or damages. Since, the control pressure is generated in the electronically controlled trailer control module, no control pressure of other brake circuits of the vehicle needs to be connected to the trailer brake circuit and an EBS control of the trailer is possible. The control pressure circuits of the vehicle are protected if leakage occurs in the trailer or if the trailer is disconnected.

In electronically controlled brake systems electro-pneumatic trailer control valve arrangements as used in the scope of the present disclosure are often used as axle-modulators for modulating a pressure supplied to the brake actuators of an axle. By connecting both connection lines for the trailer, an axle modulator as known in the art can be utilized as an electronically controlled trailer control module according to the present disclosure. Axle modulators are widely-used components with good availability. Preferably, a single channel axle-modulator is used as the electronically controlled trailer control module.

In a first embodiment of the present disclosure the trailer supply connection is in direct fluid connection with the first supply port. Thus, pressure supplied to the first supply port is directly transmitted to the trailer supply connection. However, it should be understood that one or more manifolds can be arranged in-between the trailer supply connection and the trailer supply port. Preferably a manifold is arranged between the first supply port and the trailer supply connection such that pressure supplied to the first supply port is also supplied to the electro pneumatic trailer valve arrangement. Thus, only a single supply line is needed for the electronically controlled trailer control module. This results in a simple and economically efficient brake system layout. Preferably, the electro-pneumatic trailer control valve arrangement, the electronic trailer control unit, the first supply port and the trailer supply connection are arranged in a housing. However, it may also be the case that the components are not arranged in a single housing or that only some of the components are contained in the housing. For example, a connection or a manifold between the trailer supply connection and the first supply port can be arranged outside a housing of the electronically controlled trailer control module.

Preferably, the electro-pneumatic trailer control valve arrangement of the electronically controlled trailer control module includes a relay valve, comprising a relay valve supply port in fluid connection with the first supply port, a relay valve working port in fluid connection with the trailer control connection and a relay valve control port. Compressed air is supplied to the relay valve supply port via the first supply port. The pressure of the compressed air is modulated in the relay valve such that a control pressure is supplied at the relay valve working port. A relay valve control signal is provided to the relay valve control port for controlling a pressure level of the braking supplied at the relay valve working port. In a pneumatic relay valve the relay valve control signal is a control pressure. Thus, the relay valve function can be achieved in a purely mechanical manner and is ensured even if the electro-pneumatic trailer control valve arrangement or the electronic trailer control unit is de-energized. In addition, pneumatic relay valves are robust and hardly susceptible to malfunctions. Preferably, the pressure supplied to the relay valve working port is equal or has a predefined ratio to the control pressure.

In a preferred embodiment the relay valve is configured such that the trailer control pressure is only provided at the relay valve working port when compressed air is supplied to the relay valve supply port. The relay valve in this embodiment ensures the tractor protection function. When a control signal is supplied to the relay valve control port, the relay valve modulates the pressure supplied to the relay valve supply port such that a trailer control pressure is provided at the relay valve working port. When no control pressure is supplied to the relay valve control port the relay valve is in a closed position such that no pressure is provided at the relay valve working port. Furthermore, when no pressure is supplied to the relay valve supply port no pressure is provided at the relay valve working port irrespective of the pressure supplied to the relay valve control port. Thus, the tractor protection function is achieved. A pressure provided at the first supply connection can be controlled via the relay valve control pressure. Preferably, the relay valve supply port is in direct fluid connection with a manifold arranged between the trailer supply connection and the first supply port.

It is preferred that a trailer control pressure provided at the relay valve working port is equal to a relay valve control pressure supplied to the relay valve control port. It may also be preferred that the pressure provided at the relay valve working port is in a predefined ratio to the control pressure. Preferably a first effective area of the relay valve exerted to supply pressure is equal to a second effective area of the relay valve which is exerted to control pressure provided via the relay valve control port. Thus, resulting forces on the first and second effective area are equal such that a self-regulating relay valve design is achieved.

In a preferred embodiment the electro-pneumatic valve arrangement of the electronically controlled trailer control module comprises a first electro-pneumatic control valve for providing a relay valve control pressure, wherein a first electro-pneumatic working port of the first electro-pneumatic control valve is in fluid connection with the relay valve control port. Thus, the relay valve control pressure is provided by the first electro-pneumatic control valve. Preferably the first electro-pneumatic control valve is an electronically controllable 2/2-way-valve or alternatively an electronically controllable 3/2-way-valve. Preferably the first electro-pneumatic control valve is closed in a de-energized state. It is further preferred that a first electro-pneumatic supply port of the first electro-pneumatic control valve is in direct fluid connection with the first supply port. Thus, the relay valve control pressure is provided from the supply pressure supplied to the first supply port.

In a further embodiment it is preferred that the electronically controlled trailer control module further comprises a redundancy connection for receiving a redundancy pressure and a redundancy valve arrangement for adjusting the trailer control pressure when the electro-pneumatic trailer control valve arrangement is de-energized, wherein the redundancy valve arrangement is in fluid connection with the redundancy connection and the relay valve control port. Due to a failure in an electrical system of the electronically controlled pneumatic brake system it may be possible that the electro-pneumatic valve arrangement is de-energized and that in an emergency situation no trailer control pressure can be provided via the electro-pneumatic trailer control valve arrangement. The redundancy valve arrangement therefore mainly acts as a safety arrangement. Preferably, a redundancy pressure is supplied to the redundancy connection and thus to the relay valve control port. If supply pressure is supplied to the relay valve supply port via the first supply port, a control pressure can be provided at the trailer control connection even if the system is de-energized.

Preferably, the redundancy valve arrangement comprises an electro-pneumatic redundancy valve which is open in a de-energized state. Thus, the electro-pneumatic redundancy valve and the electro-pneumatic trailer control valve arrangement can be supplied with electrical energy from the same source. In this case the redundancy valve arrangement is closed when a relay valve control pressure is supplied to the relay valve control port. If the system is de-energized the electro-pneumatic trailer control valve arrangement is closed and the electro-pneumatic redundancy valve is opened such that redundancy pressure supplied to the redundancy connection is applied to the relay valve control port. Preferably, control pressure is supplied to the relay valve control port only via one connection at a time. Herewith it is ensured that a desired control pressure is supplied to the trailer control connection and malfunctions of the electronically controlled brake system can be inhibited. Preferably, the electro-pneumatic redundancy valve is an electronically controllable 2/2-way valve. It is particularly preferred that the electro-pneumatic redundancy comprises a biasing member, such as a spring, for biasing the valve in an open position.

It is further preferred that the electro-pneumatic redundancy valve is controlled by the electronic trailer control unit. Thus, the redundancy function is also ensured if the electronic trailer control unit malfunctions. It may also be preferred that the electro-pneumatic redundancy valve is configured to modulate the trailer control pressure. It may then be further preferred that the first redundancy connection is in fluid connection with the first air supply or a second air supply of the electronically controlled pneumatic brake system.

In a further preferred embodiment the electronically controlled pneumatic brake system further comprises a parking brake circuit with a first parking brake valve comprising a first parking brake supply port in fluid connection with the first compressed air supply and a first parking brake working port in fluid connection with the first supply port of the electronically controlled trailer control module for providing the supply pressure at the first supply port. Thus, compressed air is supplied to the trailer control circuit via the parking brake valve. In a preferred embodiment the parking brake may be configured to inhibit pressurization of the trailer control circuit when the parking brake valve is closed. The parking brake circuit is preferably configured to permanently provide control pressure to the trailer or to brake the vehicle when activated. The first parking brake supply port is preferably in direct fluid connection with the first air supply.

It is further preferred that the first parking brake valve automatically closes when a pressure at the first supply port of the electronically controlled trailer control module is lower than a predetermined protection threshold. When the first parking brake valve is closed passage of air through the valve is inhibited. Thus, preferably no compressed air is supplied to the first supply port of the electronically controlled trailer control module. When the trailer supply line is disconnected from the trailer supply coupling head or leakage in the trailer brake circuit or the trailer occurs, the pressure at the first supply port decreases. When the pressure at the first supply port is lower than a predetermined protection threshold, the first parking brake valve closes and air flow from the first air supply to the electronically controlled trailer control module is inhibited. The first compressed air supply of the electronically controlled pneumatic brake system is protected from being emptied. Thus, it is ensured that compressed air can be supplied to the front axle brake circuit, the parking brake circuit or the first brake circuit via the first compressed air supply when leakage occurs or the trailer is disconnected. Since air supply to the trailer supply connection is closed, no trailer control pressure is supplied to the trailer control connection via the electronically controlled trailer control module. The first parking brake valve may be a push pull valve, preferably a 2/2-way push pull valve. It is particularly preferred that the parking brake valve is closed in a pulled position.

In a preferred embodiment the first parking brake valve is formed as a spring biased parking brake valve, which is automatically closed by a first spring when a pressure at the first parking brake supply port or at the first parking brake working port is lower than the predetermined protection threshold. Preferably, the predetermined protection threshold is defined by the spring. The spring biased parking brake valve may comprise a first effective area. When the spring biased parking brake valve is brought into an open position the first effective area is subjected to the pressure at the parking brake supply port or the first parking brake working port. As long as the pressure at the parking brake supply port or the first parking brake working port exceeds the predetermined protection threshold, a resulting force on the effective area is larger than or equal to a biasing force of the first spring and the first parking brake remains in an open position. If the pressure on the effective area is reduced below a level of the predetermined protection threshold the first spring pushes the valve in a closed position. Preferably, the first parking brake valve is configured for adjusting the predetermined protection threshold.

It is further preferred that the parking brake circuit is an electronically controlled parking brake circuit. The electronically controlled parking brake circuit may comprise a parking brake electronic control unit or may be controlled via a main electronic control unit of the electronically controlled pneumatic brake system. It is further preferred that the electronically controlled parking brake circuit comprises a pressure sensor for measuring the pressure at the first supply port or any point in direct fluid connection to the first supply port. Preferably, the parking brake electronic control unit or the main electronic control unit is configured to close the electronically controlled parking brake circuit when a pressure at the first supply port of the electronically controlled trailer control module is lower than the predetermined protection threshold. It is further preferred that the electronically controlled parking brake circuit is closed in a de-energized state.

In a preferred embodiment the electronically controlled pneumatic brake system further comprises a foot brake module for providing a first axle brake pressure, preferable a rear axle brake pressure, for the first brake circuit, which preferably is the rear axle brake circuit or a second axle brake pressure, preferably front axle brake pressure, for the second brake circuit, which preferably is the front axle brake circuit, at a first foot brake module control port, wherein the redundancy connection of the electronically controlled trailer control module is connected to the first foot brake module control port. A pressure provided in the foot brake module is thus supplied to the redundancy connection of the electronically controlled trailer control module. If the first electro-pneumatic trailer valve is de-energized the pressure provided in the foot brake module is then preferably supplied to the trailer control connection and acts as a trailer control pressure. The foot brake module preferably is a pneumatic foot brake module.

In a further preferred embodiment the foot brake module is an electronic foot brake module connected to a main electronic control unit of the electronically controlled pneumatic brake system and configured to provide a brake signal to the electronic control unit or the electronic trailer control unit. This is particularly preferred if the entire brake system is controlled by the main electronic control unit. This may be particularly desirable for semi and or fully autonomous vehicles. It is also preferred that the electronic foot brake module comprises a control element for receiving a user request. Preferably, the foot brake module is configured to send a user request signal to the main electronic control unit.

According to a second aspect of the present disclosure the above stated problem is solved by a vehicle, in particular commercial vehicle, comprising a front axle, a rear axle and an electronically controlled pneumatic brake system according to the first aspect of the present disclosure. It should be understood that the vehicle according to the second aspect of the present disclosure and the electronically controlled pneumatic brake systems according to the first aspect of the present disclosure preferably have similar of equal aspects, in particular as they are described in the dependent claims. Thus, reference is made to the above description of the electronically controlled pneumatic brake system according to the first aspect of the present disclosure.

For a more complete understanding of the present disclosure, the present disclosure will now be described in detail with reference to the accompanying drawings. The detailed description will illustrate and describe what is considered as preferred embodiments of the present disclosure. It should of course be understood that various modifications and changes in form or detail could readily be made without departing from the spirit of the present disclosure. It is therefore intended that the present disclosure may not be limited to the exact form and detail shown and described herein, nor to anything less than the whole of the present disclosure disclosed herein and as claimed herein after. Further, the features described in the description, the drawings and the claims disclosing the present disclosure may be essential for the present disclosure considered alone or in combination. In particular, any reference signs in the claims shall not be construed as limiting the scope of the present disclosure. The wording "comprising" or "including" does not exclude other elements or steps. The word "a" or "an" does not exclude the plurality. The word "or" is used in the mathematical sense to designate one or the other or both, unless specifically disclaimed. The wording "a number of" items comprising also the number 1, i.e. a single item, and further numbers like 2, 3, 4 and so forth.

DETAILED DESCRIPTION OF THE DRAWINGS

Figure 1:
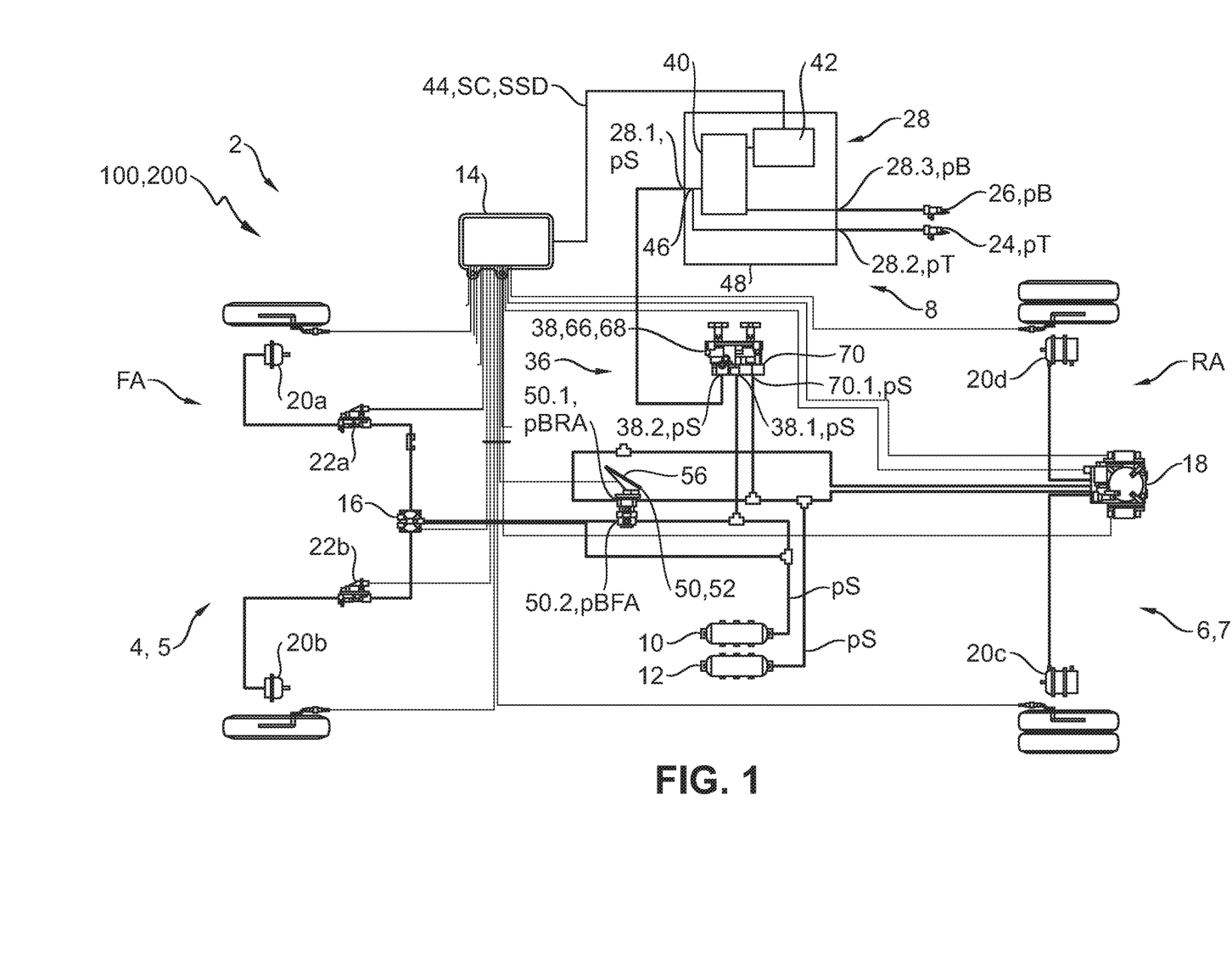
FIG. 1 shows a schematic layout of an electronically controlled pneumatic brake system according to a first embodiment of the present disclosure.

A vehicle 100, in particular a commercial vehicle 200, comprises a front axle FA and a rear axle RA. For braking the front axle FA and the rear axle RA the vehicle 100 comprises an electronically controlled pneumatic brake system 2.

The electronically controlled pneumatic brake system 2 comprises a first brake circuit 4, which here is front axle brake circuit 5 for the front axle FA, and a second brake circuit 6, which here is a rear axle brake circuit 7 for the rear axle RA. Furthermore, the electronically controlled pneumatic brake system 2 comprises a trailer control circuit 8. The electronically controlled pneumatic brake system 2 further comprises a first compressed air supply 10, which provides compressed air at a supply pressure pS. In this embodiment the first compressed air supply 10 supplies the first brake circuit 4 and the trailer control circuit 8. The second brake circuit 6 is supplied by a second compressed air supply 12, which also provides compressed air at the supply pressure pS. Here, the trailer control circuit 8 is also in fluid connection with the second compressed air supply 12. However, it is also preferred that the first compressed air supply 10 or the second compressed air supply 12 supplies the first or second brake circuit 4, 6, only. Compressed air is provided to the first and second compressed air supplies 10, 12 by an air treatment system, which is not shown.

The electronically controlled pneumatic brake system 2 includes a main electronic control unit 14, which is also referred to as ECU, for controlling its elements. The ECU in particular controls a front axle modulator 16 provided for the front axle FA and a rear axle modulator 18 provided for the rear axle RA. The front axle modulator 16 is connected to first and second front axle ABS-modules 22a, 22b which in turn are connected to first and brake actuators 20a, 20b and the rear axle modulator 18 is connected to third and fourth brake actuators 20c, 20d. Preferably one or more brake actuators 20c, 20d, 20e, 20f of the rear axle RA are connected to ABS-modules 22c, 22d which are then connected to the rear axle modulator 18. The ABS-modules 22a, 22b, 22c, 22d are controlled by the ECU.

The trailer control circuit 8 comprises a supply coupling head 24 and a control coupling head 26. Both coupling heads 24, 26 are in direct fluid connection with an electronically controlled trailer control module 28 of the trailer control circuit 8.

The supply coupling head 24 is in fluid communication with a trailer supply connection 28.2 of the electronically controlled trailer control module 28 while the control coupling head 26 is in fluid connection with a trailer control connection 28.3 of the electronically controlled trailer control module 28. The electronically controlled trailer control module 28 further comprises a first supply port 28.1 for connecting the first compressed air supply 10. As shown in this case, the first supply port 28.1 does not need to be in direct fluid connection with the first compressed air supply 10. Here, a first parking brake valve 38 of a parking brake circuit 36 is arranged in between the first supply port 28.1 of the electronically controlled trailer control module 28 and the first compressed air supply 10. However, it should be understood that the first air supply 10 may also be in direct fluid connection with the first supply port 28.1.

The electronically controlled trailer control module 28 further comprises an electro-pneumatic trailer control valve arrangement 40, which is only schematically shown in FIG. 1. The electro-pneumatic trailer control valve arrangement 40 is controlled by an electronic trailer control unit 42 which is also referred to as ETCU. In this embodiment the ETCU 42 is connected to the ECU 14 via a tractor protection valve line 44 for receiving an electronic control signal SC or sending trailer control module status data signal SSD. Preferably the electronically controlled trailer control module 28 is energized via the tractor protection valve line 44 and the ECU 14. However, the electronically controlled trailer control module 28 may also comprise a power supply port (not shown) for connecting an external power supply. The electro-pneumatic trailer control valve arrangement 40 is in fluid connection with the first supply port 28.1 and configured to provide a trailer control pressure pB at the trailer control connection 28.3. Here, a manifold 46 is arranged in between the first supply port 28.1 and the electro-pneumatic trailer control valve arrangement 40 such that supply pressure pS is supplied to the electro-pneumatic trailer control valve arrangement 40 as well as the trailer supply connection 28.2. The trailer supply connection 28.2 is in direct fluid connection with the first supply port 28.1. The electro-pneumatic trailer control valve arrangement 40, the ETCU 42, and the manifold 46 are preferably arranged in a casing 48 of the electronically controlled trailer control module 28. However, it is also preferred that some of the components are arranged outside of the casing 48.

The electronically controlled pneumatic brake system 2 includes a foot brake module 50, in particular a pneumatic foot brake module 52, for providing a front axle brake pressure pBFA and a rear axle brake pressure pBRA. The foot brake module 50 may also be an electronic foot brake module 54. If a user steps on the pedal 56 of the pneumatic foot brake module 52 a rear axle brake pressure pBRA is provided at a first foot brake module control port 50.1 and a front axle brake pressure pBFA is provided at a second foot brake module control port 50.2. From the first foot brake module control port 50.1 the rear axle brake pressure pBRA is directed to the rear axle modulator 18 while the front axle brake pressure pBFA is directed to the front axle modulator 16 via the second foot brake module control port 50.2.

The first parking brake valve 38 comprises a first parking brake supply port 38.1 in fluid connection with the first compressed air supply 10 and a first parking brake working port 38.2 in fluid connection with the first supply port 28.1 of the electronically controlled trailer control module 28. Thus, compressed air can be supplied to the first supply port 28.1 of the electronically controlled trailer control module 28 from the first compressed air supply 10 via the first parking brake valve 38. Here the first parking brake valve 38 and a second parking brake valve 70 for actuating tractor parking brakes (not shown) are arranged in a single body. However, it shall be understood that the electronically controlled pneumatic brake system 2 may only comprise the first parking brake valve 38 or that the first parking brake valve 38 and the second parking brake valve 70 may be arranged in separate bodies. The second parking brake valve 70 comprises a second parking brake supply port 70.1. A second parking brake working port 70.2 (not shown in FIG. 1; see FIG. 4) of the second parking brake valve 70 is in fluid connection with the rear axle brake circuit 6. The second parking brake supply port 70.1 is in direct fluid connection with the second compressed air supply 12.

In this embodiment the first parking brake valve 38 is a spring biased parking brake valve 66, in particular a push-pull valve 68. The second parking brake valve 70 is also configured as a pneumatic push-pull valve. When the first parking brake valve 38 is in a pulled position an air flow from the first parking brake supply port 38.1 to the first parking brake working port 38.2 is blocked such that no supply pressure pS is supplied to the first supply port 28.1 of the electronically controlled trailer control module 28. In this embodiment when parking brake valve 38 is in a pulled position no supply pressure pS is supplied to the first supply port 28.1. Thus, no trailer control pressure pB is provided in the electro-pneumatic trailer valve arrangement 40. Hence, neither trailer control pressure pB nor trailer supply pressure pS are supplied to the supply and control coupling heads 24, 26.

Figure 2A:
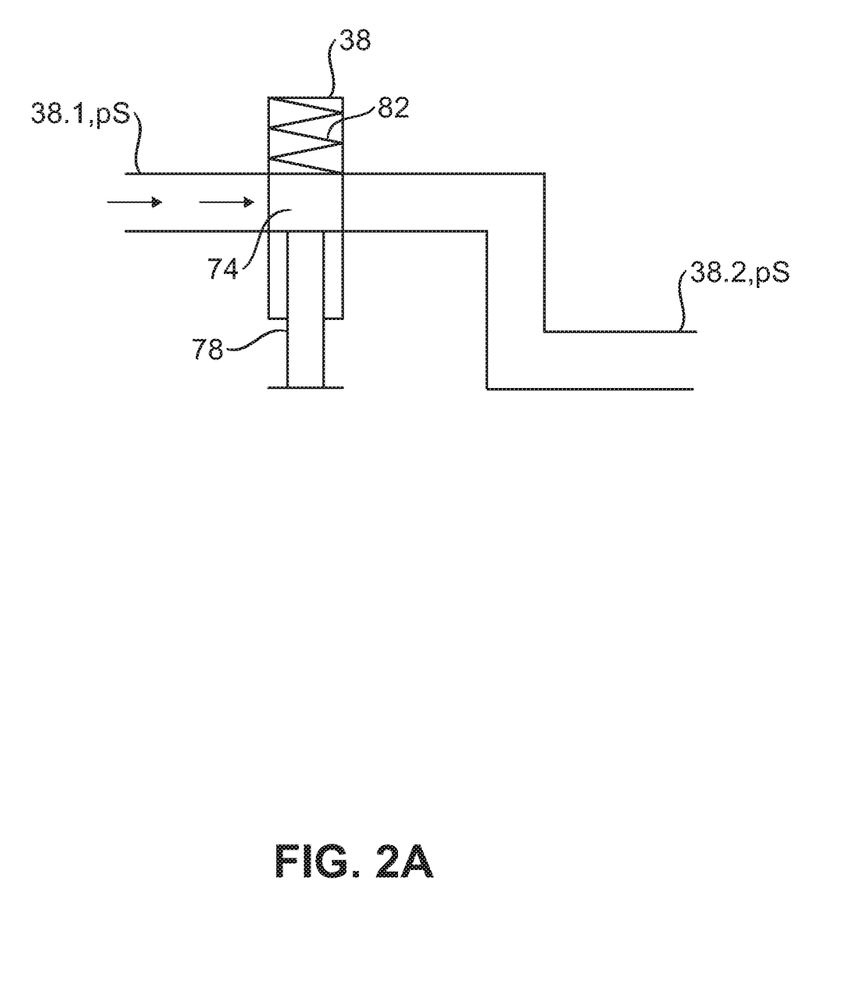
FIG. 2A shows a schematic view of a first parking brake valve according to the first embodiment of the present disclosure, wherein the first parking brake valve is in a closed position.

A working principle of the first parking brake valve 38 is further described with reference to FIGS. 2a and 2b. The working principle is generally also applicable to the second parking brake valve 70. In FIG. 2a the first parking brake valve 38 is shown in a pulled (closed) position. A first valve head 74 of the first parking brake valve 38 inhibits an air flow (indicated by arrows in FIG. 2) from the first parking brake supply port 38.1 to the first parking brake working port 38.2. The first valve head 74 is connected to a first handle 78 for manual actuation of the first parking brake valve 38. It shall be understood that the first parking brake valve 38 or the second parking brake valve 70 may also be electrically, magnetically or hydraulically actuated valves. A first spring 82 of the first parking brake valve 38 biases the first valve head 74 into the closed position.

Figure 2B:
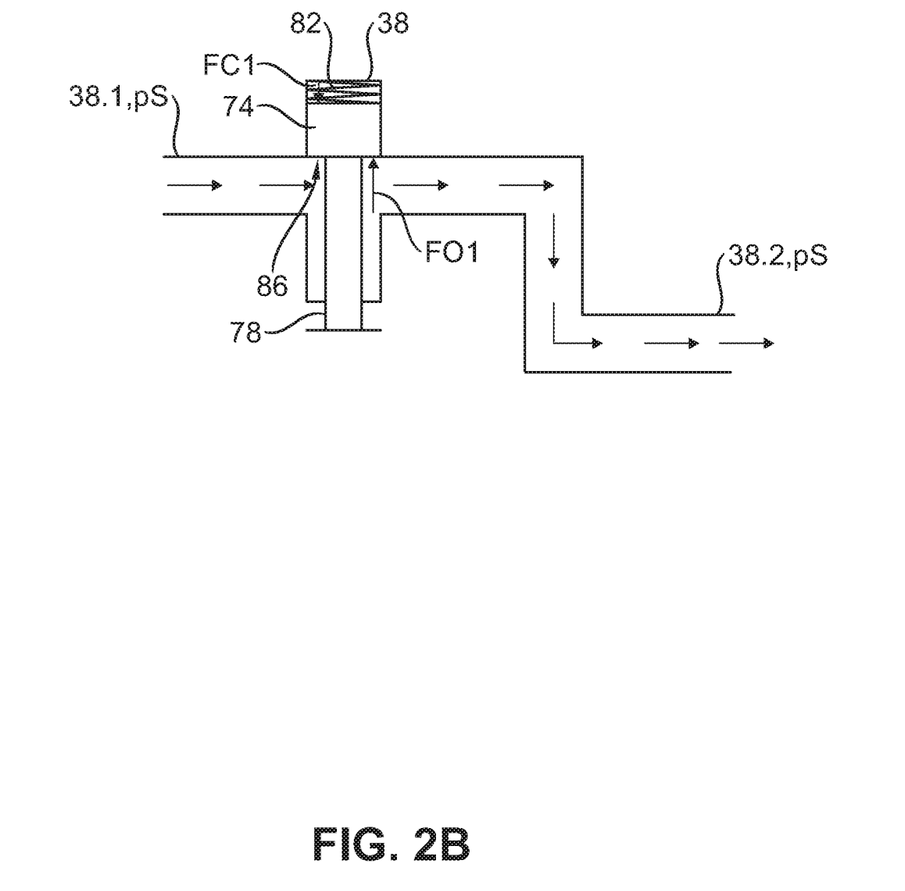
FIG. 2B shows the first parking brake according to FIG. 2A, wherein the first parking brake valve is in an open position.

In FIG. 2B the first parking brake valve 38 is in a pushed (open) position such that the first parking brake supply port 38.1 and the first parking brake working port 38.2 are fluidly connected. As indicated by the arrows in FIG. 2B, compressed air from the first compressed air supply 10 is supplied to the first supply port 28.1 of the electronically controlled trailer control module 28 via the first parking brake supply port 38.1 and the first parking brake working port 38.2. Thus, a first effective area 86 on the first valve head 74, which is perpendicular to a first closing force FC1, is subjected to the supply pressure pS such that a first opening force FO1 acts on the first effective area 86. Preferably, the first opening force FO1 is larger than or equal to the closing force FC1 applied on the first valve head 74 by the first spring 82. If the supply pressure pS decreases below a predetermined protection threshold, the first opening force FO1 is reduced such that the first spring 82 forces the first valve head 74 into a closed position.

Figure 3:
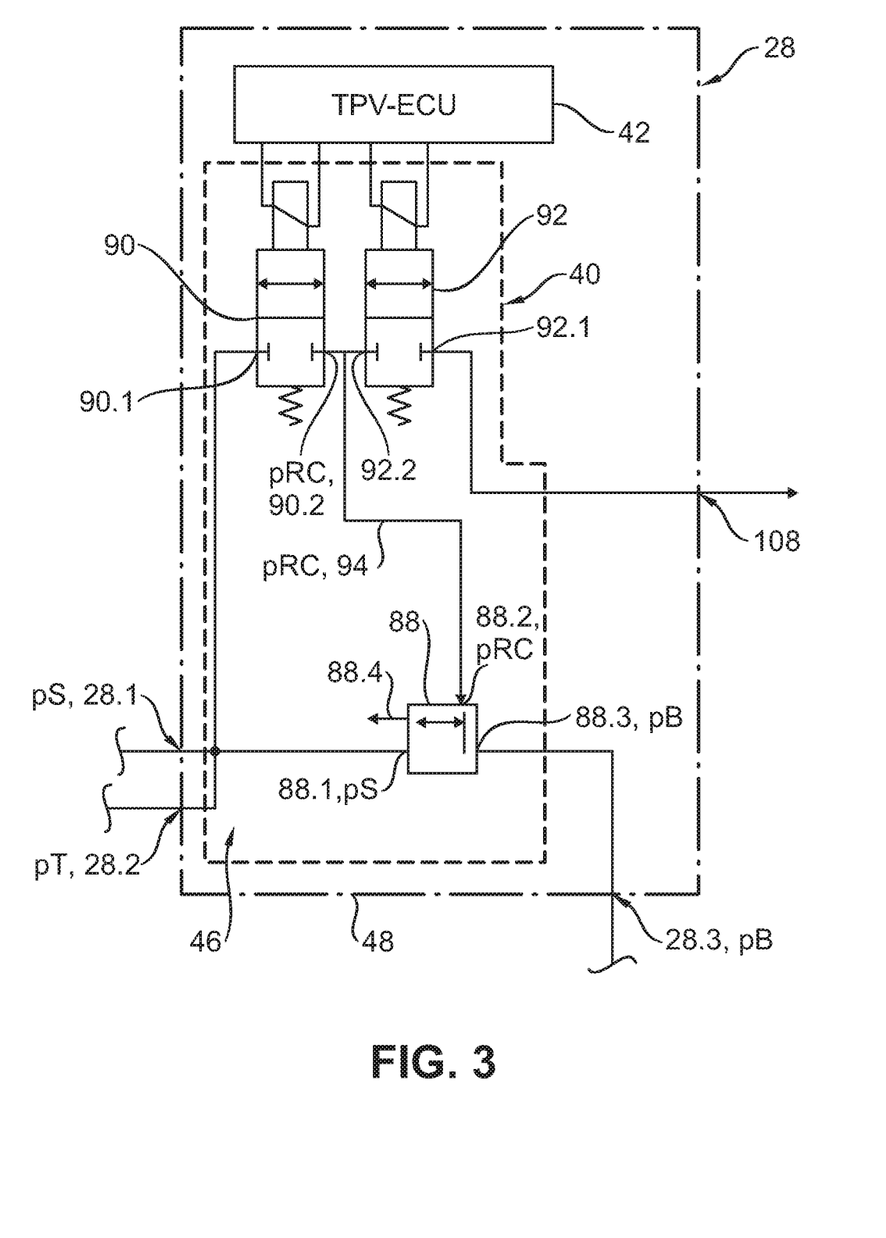
FIG. 3 shows a schematic layout of the electronically controlled trailer control module according to the first embodiment.

The electronically controlled trailer control module 28 comprises an electro-pneumatic trailer control valve arrangement 40 comprising a relay valve 88, a first electro-pneumatic control valve 90 and a bleed valve 92 (FIG. 3). Supply pressure pS is supplied to the first supply port 28.1. The manifold 46 is a three-way manifold such that supply pressure pS is supplied to a relay valve supply port 88.1 of the relay valve 88, a first electro-pneumatic supply port 90.1 of the first electro-pneumatic control valve 90 and to the trailer supply connection 28.2, at the trailer supply connection 28.2 as the trailer supply pressure pT. A first electro-pneumatic working port 90.2 of the first electro-pneumatic control valve 90 is in direct fluid connection with a relay valve control port 88.2 of the relay valve 88. The first electro-pneumatic control valve 90 is a 2/2-way solenoid valve connected to an electronic trailer control unit 42 (ETCU). The ETCU 42 is configured to control the first electro-pneumatic control valve 90 such that a relay valve control pressure pRC, which here equals the trailer control pressure pB, is provided at the first electro-pneumatic working port 90.2. The first electro-pneumatic control valve 90 is configured such that it is closed in a de-energized state. The first electro-pneumatic working port 90.2 is further connected to the bleed valve 92 which is a 2/2-way solenoid valve, which is preferably closed in a de-energized state. A first bleed port 92.1 of the bleed valve 92 is connected to a bleed port 108 of the electronically controlled trailer control module 28. Preferably a silencer is arranged upstream or downstream of the bleed port 108 (not shown in FIG. 3). The bleed valve 92 is also connected to the ETCU 42. If the bleed valve 92 is opened by the ETCU 42 pressure in a first control line 94 arranged between the first electro-pneumatic working port 90.2 and the relay valve control port 88.2 is released through the bleed port 108. The first control line 94 can be vented via a second bleed port 92.2.

The relay valve 88 is a pneumatic relay valve 89, wherein a control signal directed to a relay valve control port 88.2 of the relay valve 88 is a pneumatic control signal. The control signal is the relay valve control pressure pRC provided by the first electro-pneumatic control valve 90. The relay valve 88 modulates a supply pressure pS of compressed air supplied to the relay valve supply port 88.1 such that a control pressure pB provided at a relay valve working port 88.3 equals the relay valve control pressure pRC supplied to the relay valve control port 88.2. It shall be understood that substantially no air flow occurs from the relay valve control port 88.2 to the relay valve working port 88.3. The relay valve control pressure pRC supplied to the relay valve control port 88.2 only controls the pressure level at the relay valve working port 88.3. Thus, if no compressed air is supplied to the first supply connection 28.1 no trailer supply pressure pT is supplied to the supply coupling head 24 via the trailer supply connection 28.2 and no trailer control pressure pB is supplied to the control coupling head 26 via the trailer control connection 28.3.

Furthermore, an air flow through the first electro-pneumatic control valve 90 is very small or negligible and an accuracy of the pressure generation in the first electro-pneumatic control valve 90 can be increased. Furthermore, the relay valve 88 is purely pneumatic and thus also functions when the first electro-pneumatic trailer valve arrangement 40 is a de-energized state. Preferably, the relay valve 88 further comprises a relay valve bleed port 88.4 for releasing pressure. Furthermore, the electronically controlled trailer control module 28 may comprise a second pressure sensor for measuring a pressure supplied to the trailer control connection 28.3.

If a trailer supply line is disconnected from the supply coupling head 24 or severe leakage occurs in the trailer, compressed air is released via the supply coupling head 24. The supply pressure pS drops such that the first and second parking brake valves 38, 70 are closed by the first and second springs 82, 84 and the first or second compressed air supply 10, 12 is protected. Since there is no fluid connection between the trailer control circuit 8 and control lines of the front axle brake circuit 5 and the rear axle brake circuit 7 a front axle brake pressure pBFA and the rear axle brake pressure pBRA are also protected.

Figure 4:
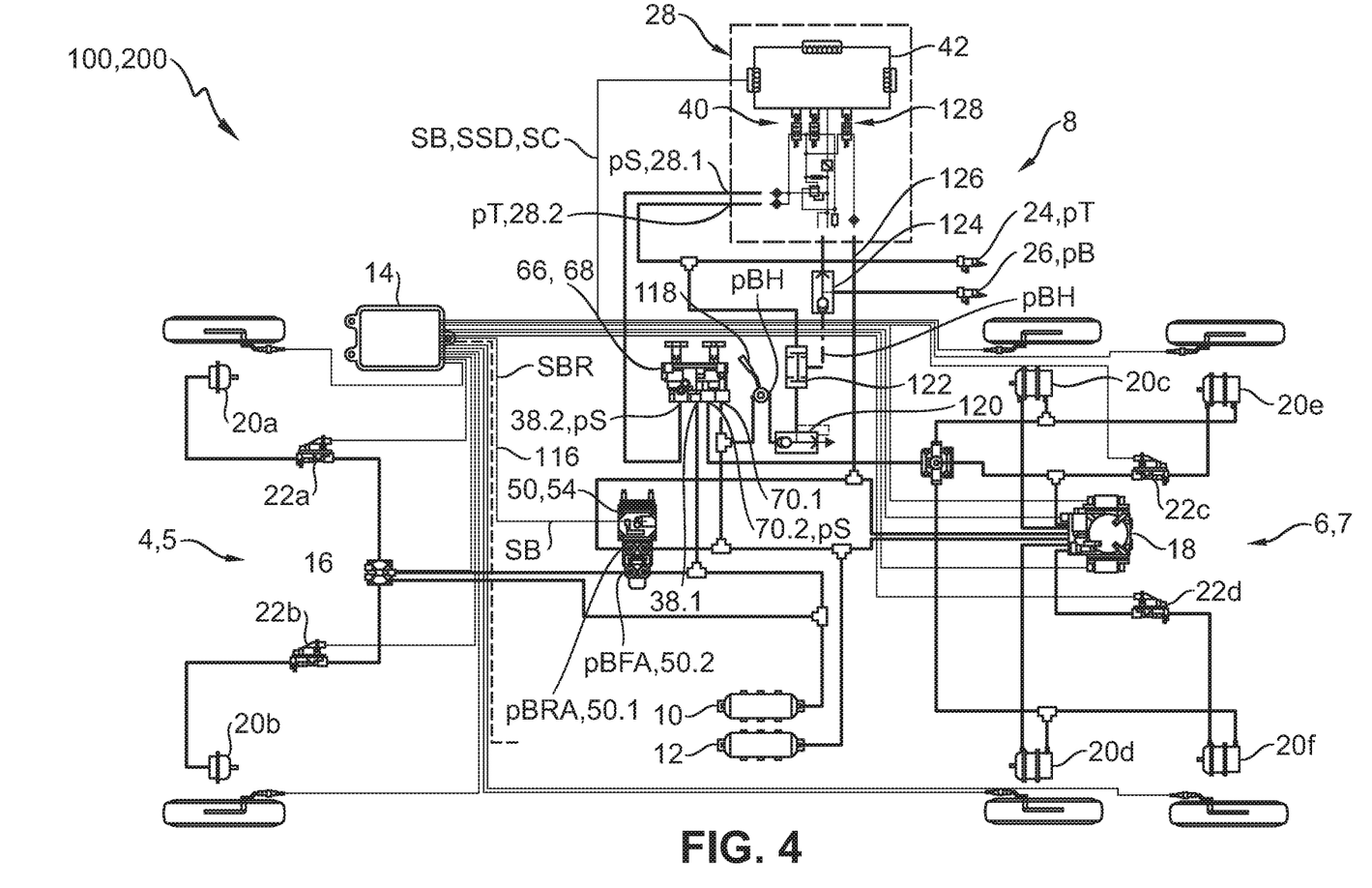
FIG. 4 shows a schematic layout of an electronically controlled pneumatic brake system according to a second embodiment of the present disclosure.

In a second embodiment the electronically controlled pneumatic brake system 2 only the first parking brake valve 38 of the parking brake circuit 36 is connected to the electronically controlled trailer control module 28 (FIG. 4). The second parking brake valve 70 is supplied with compressed air from the second compressed air supply 12 via the second parking brake supply port 70.1. When the second parking brake valve 70 is in an open position compressed air at supply pressure pS is supplied to the rear axle modulator 18. The parking brake circuit 36 further comprises a pneumatic hand brake 118 connected to the second compressed air supply 88.2 for providing a hand brake pressure pBH. The hand brake pressure pBH is transferred to the control coupling head 26 via a first shuttle valve 120, a select low valve 122 and a second shuttle valve 124. The select low valve 122 protects the trailer control line from an over pressure. As long as the hand brake pressure pBH is lower than or equal to the trailer supply pressure pT the select low valve 122 is in an open position. The second shuttle valve 124 transfers the higher pressure of the hand brake pressure pBH and the trailer control pressure pB, which is provided by the electronically controlled trailer control module 28, to the control coupling head 26. Thus, the pneumatic hand brake 118 can be used as an emergency brake or as a stretch brake for manually controlling a braking of the trailer.

In this embodiment the foot brake module 50 is an electronic foot brake module 54. The electronic foot brake module 54 is connected to the main electronic control unit 14 via a foot brake module line 116. The electronic foot brake module 54 may also be connected to the ETCU 42. Preferably upon reception of a brake signal SB the ETCU 42 controls the Electro-pneumatic trailer valve arrangement 40 to provide a corresponding trailer control pressure pB. The electronic foot brake module 54 is configured to provide a brake signal SB to the ECU 14.

Upon user request the electronic foot brake module 54 generates a rear axle brake pressure pBRA at the first foot brake module control port 50.1 and a front axle brake pressure pBFA at the second foot brake module control port 50.2. The first foot brake module control port 50.1 is in direct fluid communication with a redundancy connection 126 of the electronically controlled trailer control module 28. When the electro-pneumatic trailer control valve arrangement 40 is de-energized the trailer control pressure pB is supplied to the control coupling head 26 via the redundancy connection 126 and a redundancy valve arrangement 128 of the electronically controlled trailer control module 28. This may be the case if a malfunction of the power supply to the ETCU 42, the ETCU 42 itself, the ECU 14 or the first electro-pneumatic control valve 90 occurs. It may also be preferred that the redundancy connection 126 is in fluid connection with the second foot brake module control port 50.2.

Figure 5:
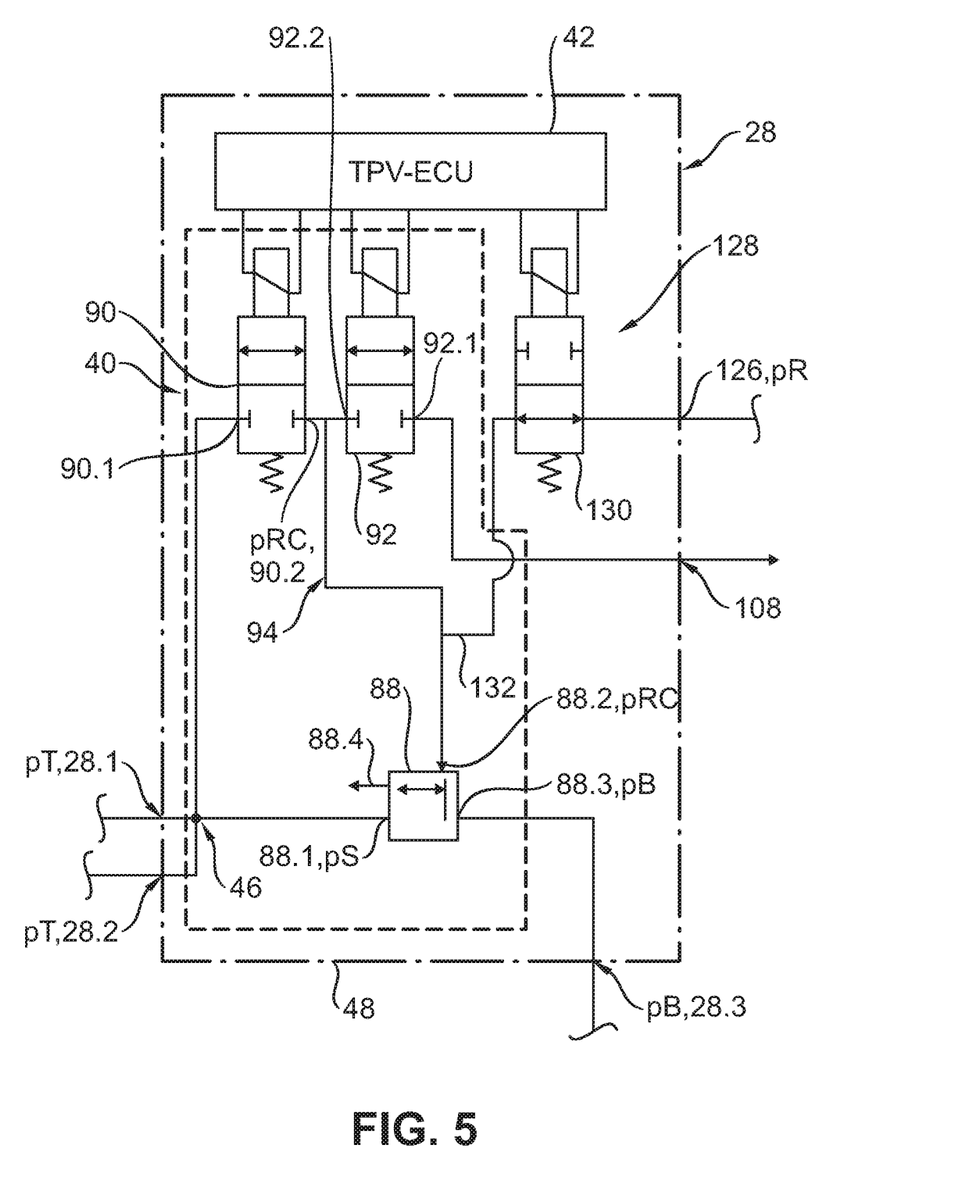
FIG. 5 shows a schematic layout of the electronically controlled trailer control module according to the second embodiment.

With reference to FIG. 5 the electronically controlled trailer control module 28 according to the second embodiment is further described. For similar or equal features of the electronically controlled trailer control module 28 according to the second embodiment reference is made to the above description of the electronically controlled trailer control module 28 according to the first embodiment.

In this embodiment the redundancy valve arrangement 128 comprises only an electro-pneumatic redundancy valve 130, which is a 2/2-way solenoid valve. However, it shall be understood that the redundancy valve arrangement 128 may comprise more than one valve or valves of a different type. For controlling the electro-pneumatic redundancy valve 130, the electro-pneumatic redundancy valve 130 is connected to the ETCU 42. Thus, the electronically controlled trailer control module 28 only comprises a single electronic control unit which allows for a cost-efficient design. Thus, if a malfunction of the ETCU 42 occurs, a redundancy pressure pR, which here is a rear axle brake pressure pBRA, is supplied to the relay valve control port 88.2 via the electro-pneumatic redundancy valve arrangement 128. Furthermore, when the ETCU 42 malfunctions the first electro-pneumatic control valve 90 and the bleed valve 92 are closed while simultaneously the electro pneumatic redundancy valve 130 is opened. The electro-pneumatic redundancy valve 130 is configured such that it is open in a de-energized state. Therefore, if the electro-pneumatic trailer valve arrangement 40 as well as the electro-pneumatic redundancy valve arrangement 128 are de-energized, a trailer control pressure pB may still be supplied to the control coupling head 26. A pneumatic redundancy is achieved. A second connection line 132 between the relay valve control port 88.2 and the electro-pneumatic redundancy valve 130 is connected to the bleed valve 92. Thus, pressure in the second connection line 132 may be released vie the bleed valve 92 and the bleed port 108 if the ETCU 42 energizes the bleed valve 92.

Figure 6:
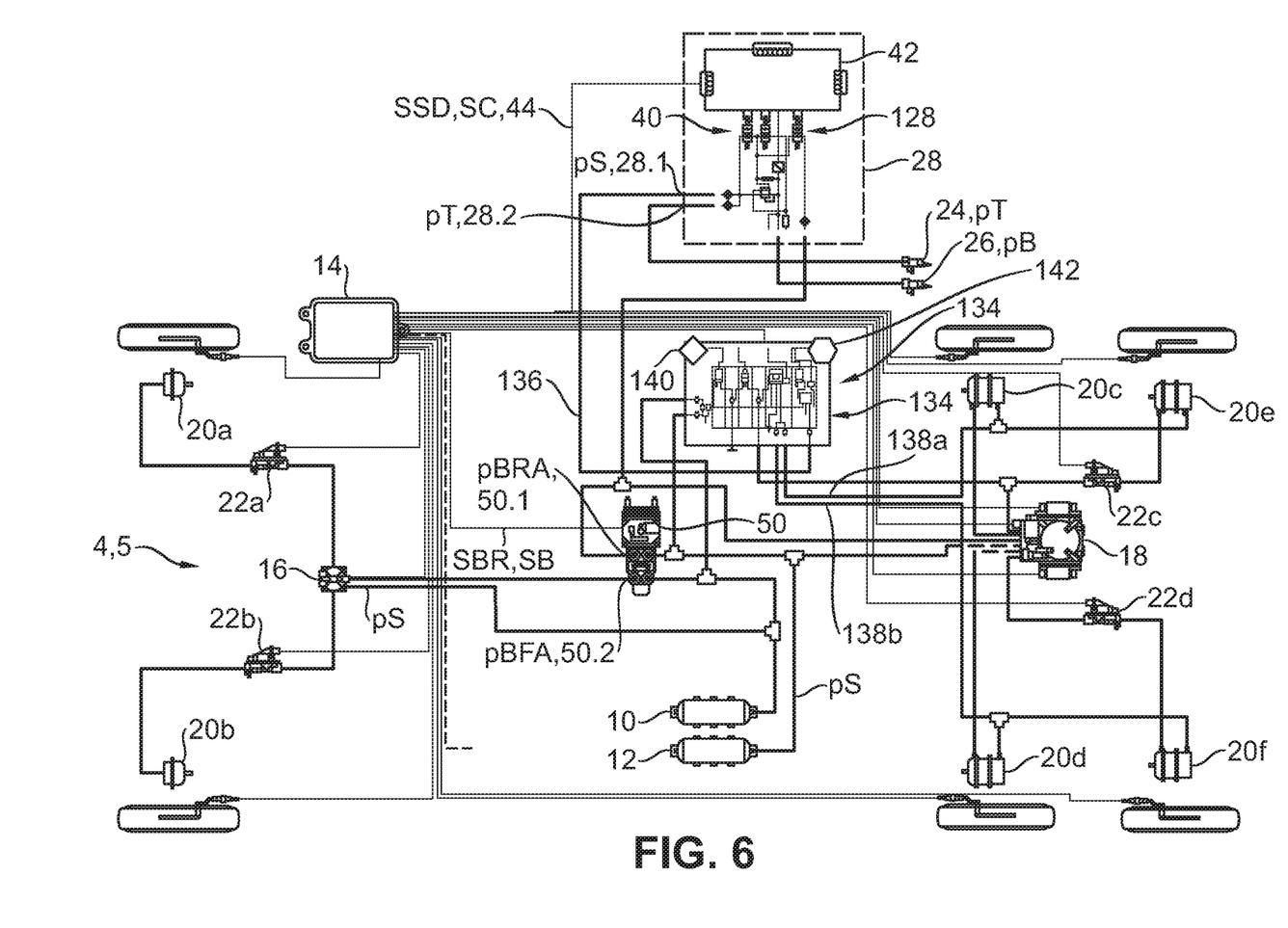
FIG. 6 shows a schematic layout of an electronically controlled pneumatic brake system according to a third embodiment of the present disclosure.

For similar or equal features of the electronically controlled pneumatic brake system 2 according to the third embodiment as shown in FIG. 6, reference is made to above description of the first and second embodiments. In this embodiment (FIG. 6) the parking brake circuit 36 is an electronically controlled parking brake circuit 134. The electronically controlled parking brake circuit 134 is supplied with compressed air from the first compressed air supply 10 and the second compressed air supply 12. Preferably, the electronically controlled parking brake circuit 134 comprises a first pressure sensor (not shown in FIG. 6) for measuring a pressure level of the supply pressure pS at the first supply port 28.1 of the electronically controlled trailer control module 28. It shall be understood that the pressure level of the supply pressure pS may also be measured in the electronically controlled parking brake circuit 134 or that the trailer pressure level pT is measured at the supply coupling head 24. It is further preferred that the electronically controlled parking brake circuit 134 is configured such that no supply pressure pS is supplied to the first supply port 28.1 when the pressure level of the supply pressure pS is lower than a predetermined protection threshold. Furthermore, the electronically controlled parking brake circuit 134 may comprise a parking brake redundancy valve arrangement (not shown in FIG. 6) for supplying supply pressure pS to the first supply port 28.1 when the electronically controlled parking brake circuit 134 is de-energized and a pressure level of the supply pressure pS is larger than the predetermined protection threshold. The electronically controlled parking brake circuit 134 may further comprise one or more user interfaces (not shown in FIG. 6) for closing the electronically controlled parking brake circuit 134 upon a user request. Preferably the electronically controlled parking brake circuit 134 comprises a first user interface 140 for a first supply line 136 to the electronically controlled trailer control module 28 and a second user interface 142 for a supply line 138a, 138b to the first axle brake actuators 22c, 22d, 22e, 22f. It shall be understood that a supply line 136, 138a, 138b of the electronically controlled parking brake circuit 134 is closed when no supply pressure pS is supplied to the supply line 136, 138a, 138b.

LIST OF REFERENCE SIGNS (PART OF THE SPECIFICATION)

2 electronically controlled pneumatic brake system
4 First brake circuit
5 Front axle brake circuit
6 second brake circuit
7 Rear axle brake circuit
8 Trailer brake circuit
10 First compressed air supply
12 Second compressed air supply
14 Main electronic control unit (ECU)
16 Front axle modulator
18 Rear axle modulator
20a-20f First to sixths brake actuator
22a-22d First to fourth ABS-module
24 supply coupling head
26 control coupling head
28 Electronically controlled trailer control module
28.1 First supply port
28.2 Trailer supply connection
28.3 Trailer control connection
36 Parking brake circuit
38 First parking brake valve
38.1 First parking brake supply port
38.2 First parking brake working port
40 Electro-pneumatic trailer valve arrangement
42 Electronic trailer control unit (ETCU)
44 Trailer protection valve line
46 Manifold
48 Casing
50 Foot brake module
50.1 First foot brake module control port
50.2 Second foot brake module control port
52 Pneumatic foot brake module
54 Electronic foot brake module
56 Pedal
66 Spring biased parking brake valve
68 Push-pull valve
70 Second parking brake valve
70.1 Second parking brake supply port
70.2 Second parking brake working port
74 First valve head
78 Handle first parking brake valve
82 First spring
86 First effective area
88 Relay valve
88.1 Relay valve supply port
88.2 Relay valve control port
88.3 Relay valve working port
88.4 Relay valve bleed port
89 Pneumatic relay valve
90 First electro-pneumatic control valve
90.1 First electro-pneumatic supply port
90.2 First electro-pneumatic working port
92 Bleed valve
92.1 First bleed port
92.2 Second bleed port
94 First control line
100 Vehicle
200 Commercial vehicle
108 Bleed port
116 Foot brake module line
118 Pneumatic hand brake
120 First shuttle valve
122 Select low valve
124 Second shuttle valve
126 Redundancy connection
128 Redundancy valve arrangement
130 electro-pneumatic redundancy valve
132 Second connection line
134 Electronically controlled parking brake circuit
136 First supply line
138 Second supply line
140 First user interface
142 second user interface
FA Front axle
FC1 First closing force
FO1 First opening force
RA Rear axle
pB Trailer control pressure
pBFA Front axle brake pressure
pBH Hand brake pressure
pBRA Rear axle brake pressure
pR Redundancy pressure
pRC Relay valve control pressure
pS Supply pressure
pT Trailer supply pressure
SB Brake signal
SBR Brake request signal
SC Electronic control signal
SSD Trailer control module status data signal

The invention claimed is:

1. An electronically controlled pneumatic brake system (2) for a vehicle (100) comprising:
a first brake circuit (4) including a first brake actuator (20a) and a second brake actuator (20b),
a second brake circuit (6) including a third brake actuator (20c) and a fourth brake actuator (20d),
a first compressed air supply (10), and
a trailer control circuit (8) comprising a supply coupling head (24) and a control coupling head (26), and
an electronically controlled trailer control module (28), comprising:
a first supply port (28.1) for receiving supply pressure (pS) from the first compressed air supply (10),
a trailer supply connection (28.2) for providing a trailer supply pressure (pT) at the supply coupling head (24),
a trailer control connection (28.3) for providing a trailer control pressure (pB) at the control coupling head (26),
an electro-pneumatic trailer control valve arrangement (40) in fluid connection with the first supply port (28.1) for receiving the supply pressure (pS) and adapted to provide the trailer control pressure (pB) at the trailer control connection (28.3), and an electronic trailer control unit (42) for controlling the electro-pneumatic trailer control valve arrangement (40) such that the trailer control pressure (pB) can be modulated, wherein the electro-pneumatic trailer control valve arrangement (40) is configured to provide the trailer control pressure (pB) at the trailer control connection (28.3) only while the supply pressure (pS) is supplied to the trailer supply connection (28.2).

2. The electronically controlled pneumatic brake system (2) according to claim 1, wherein the trailer supply connection (28.2) is directly connected to the first supply port (28.1).

3. The electronically controlled pneumatic brake system (2) according to claim 1, wherein the electro-pneumatic trailer control valve arrangement (40) includes a relay valve (88), comprising a relay valve supply port (88.1) in fluid connection with the first supply port (28.1), a relay valve working port (88.3) in fluid connection with the trailer control connection (28.3) and a relay valve control port (88.2).

4. The electronically controlled pneumatic brake system (2) according to claim 3, wherein the relay valve (88) is configured to provide the trailer control pressure (pB) at the relay valve working port (88.3) only while compressed air is supplied to the relay valve supply port (88.1).

5. The electronically controlled pneumatic brake system (2) according to claim 3, wherein the electro-pneumatic valve arrangement (40) of the electronically controlled trailer control module (28) comprises a first electro-pneumatic control valve (90) for providing a relay valve control pressure (pRC), wherein a first electro-pneumatic working port (90.2) of the first electro-pneumatic control valve (90) is in fluid connection with the relay valve control port (88.2).

6. The electronically controlled pneumatic brake system (2) according to claim 5, wherein a first electro-pneumatic supply port (90.1) of the first electro-pneumatic control valve (90) is directly connected to the first supply port (28.1).

7. The electronically controlled pneumatic brake system (2) according to claim 3, wherein the electronically controlled trailer control module (28) further comprises a redundancy connection (126) for receiving a redundancy pressure (pR), and a redundancy valve arrangement (128) for adjusting the trailer control pressure (pB) when the electro-pneumatic trailer valve arrangement (40) is de-energized, wherein the redundancy valve arrangement (128) is in fluid connection with the redundancy connection (126) and the relay valve control port (88.2).

8. The electronically controlled pneumatic brake system (2) according to claim 7, wherein the redundancy valve arrangement (128) comprises an electro-pneumatic redundancy valve (130) which is open in a de-energized state.

9. The electronically controlled pneumatic brake system (2) according to claim 1, further comprising a parking brake circuit (36) with a first parking brake valve (38) having a first parking brake supply port (38.1) in fluid connection with the first compressed air supply (10), and a first parking brake working port (38.2) in fluid connection with the first supply port (28.1) of the electronically controlled trailer control module (28) for providing the supply pressure (pS) at the first supply port (28.1).

10. The electronically controlled pneumatic brake system (2) according to claim 9, wherein the first parking brake valve (38) automatically closes when a pressure at the first supply port (28.1) of the electronically controlled trailer control module (28) is lower than a predetermined protection threshold.

11. The electronically controlled pneumatic brake system (2) according to claim 10, wherein the first parking brake valve (38) is formed as a spring biased parking brake valve (66), which is automatically closed by a first spring (82) when a pressure of at least one of the first parking brake supply port (38.1) and the first parking brake working port (38.2) is lower than the predetermined protection threshold.

12. The electronically controlled pneumatic brake system (2) according to claim 9, wherein the parking brake circuit (36) is an electronically controlled parking brake circuit (134).

13. The electronically controlled pneumatic brake system (2) according to claim 1, further comprising a foot brake module (50) for providing at least a first axle brake pressure (pBFA) for the first brake circuit (4) or a second axle brake pressure (pBRA) for the second brake circuit (6) at a first foot brake module control port (50.1), wherein a redundancy connection (126) of the electronically controlled trailer control module (28) is connected to the first foot brake module control port (50.1).

14. The electronically controlled pneumatic brake system (2) according to claim 13, wherein the foot brake module (50) is an electronic foot brake module (54) connected to a main electronic control unit (14) of the electronically controlled pneumatic brake system (2) and configured to provide a brake signal (SB) to the main electronic control unit (14) or the electronic trailer control unit (42).

15. A commercial vehicle (100, 200), comprising a front axle (FA), a rear axle (RA) and an electronically controlled pneumatic brake system (2) according to claim 1.

16. The electronically controlled pneumatic brake system (2) according to claim 1, wherein the brake system is for a commercial vehicle.

* * * * *